(12) United States Patent
Subramaniam

(10) Patent No.: US 12,716,984 B2
(45) Date of Patent: Aug. 25, 2026

(54) ANCHOR LOCATION CALIBRATION

(71) Applicant: Hewlett-Packard Development Company, L.P., Spring, TX (US)

(72) Inventor: Ravi Shankar Subramaniam, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 560 days.

(21) Appl. No.: 18/248,681

(22) PCT Filed: Oct. 12, 2020

(86) PCT No.: PCT/US2020/044653
§ 371 (c)(1),
(2) Date: Apr. 11, 2023

(87) PCT Pub. No.: WO2022/081121
PCT Pub. Date: Apr. 21, 2022

(65) Prior Publication Data

US 2023/0375657 A1 Nov. 23, 2023

(51) Int. Cl.
*G01S 5/02* (2010.01)
*G01S 13/76* (2006.01)
*H04W 64/00* (2009.01)

(52) U.S. Cl.
CPC ............ *G01S 5/0242* (2013.01); *G01S 13/76* (2013.01); *H04W 64/00* (2013.01)

(58) Field of Classification Search
CPC .......... G01S 1/022; G01S 11/02; G01S 13/76; G01S 5/021; G01S 5/0242; H04W 4/029; H04W 4/33; H04W 4/023; H04W 64/00
See application file for complete search history.

(56) References Cited

U.S. PATENT DOCUMENTS 8,983,774 B2 3/2015 Gao et al.
9,557,402 B2 1/2017 Bartov et al.
10,117,051 B2 10/2018 Banavar et al.
10,551,479 B1 2/2020 Ylamurto et al.
2008/0220780 A1 9/2008 Huseth et al.
(Continued)

FOREIGN PATENT DOCUMENTS

CN 102395198 A 3/2012
CN 104333903 A 2/2015
(Continued)

*Primary Examiner* — Timothy X Pham
(74) *Attorney, Agent, or Firm* — Quarles & Brady LLP

(57) ABSTRACT

In an example implementation according to aspects of the present disclosure, a wireless anchor node comprises a wireless communication interface and a processor communicatively coupled to the wireless communication interface. The processor receives a wireless signal from a source access node. The location of the source access node is verified. The processor determines a distance measurement between the wireless anchor node and the source access node based on the wireless signal and transfers the distance measurement between the wireless anchor node and the source access node to a target access node over an intermediate anchor node. In response, the processor receives a location error from the target access node over the intermediate anchor node. The location of the target access node is verified. The processor calibrates the distance measurement between the wireless anchor node and the source access node based on the location error.

20 Claims, 6 Drawing Sheets

(56) References Cited

U.S. PATENT DOCUMENTS

| | | | |
|---|---|---|---|
| 2009/0073043 | A1 | 3/2009 | Nozaki |
| 2014/0269400 | A1 | 9/2014 | Aldana et al. |
| 2017/0026951 | A1 | 1/2017 | Lou et al. |
| 2019/0069263 | A1 | 2/2019 | Ylamurto et al. |
| 2019/0141668 | A1 | 5/2019 | Meredith et al. |
| 2022/0322043 | A1 | 10/2022 | He et al. |

FOREIGN PATENT DOCUMENTS

| | | | |
|---|---|---|---|
| CN | 106131797 | A | 11/2016 |
| CN | 110324781 | A | 10/2019 |
| CN | 111033294 | A | 4/2020 |
| KR | 10-2010-0077414 | A | 7/2010 |
| WO | 2012/095922 | A1 | 7/2012 |

Figure 1:
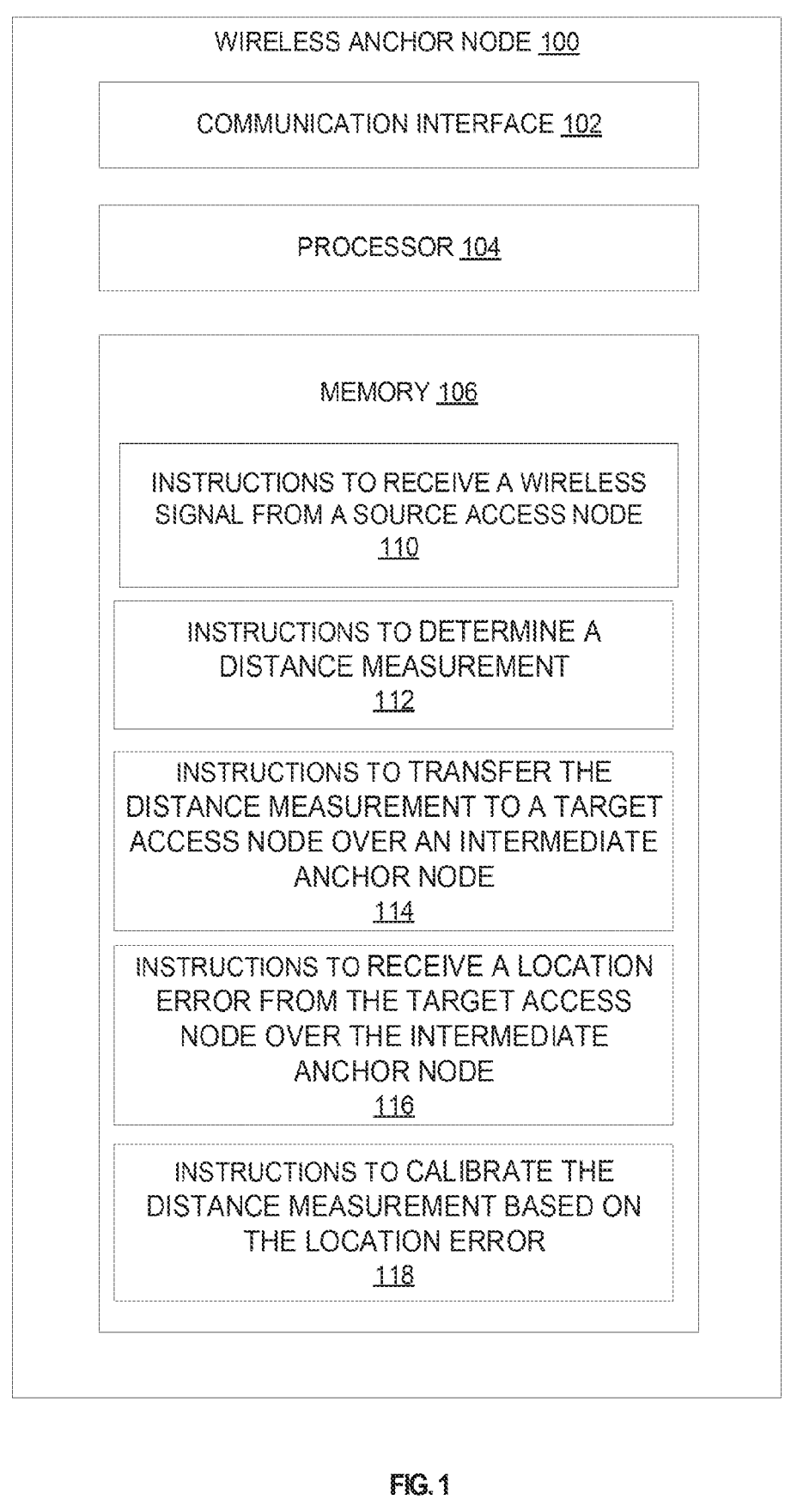

WIRELESS ANCHOR NODE 100

COMMUNICATION INTERFACE 102

PROCESSOR 104

MEMORY 106

INSTRUCTIONS TO RECEIVE A WIRELESS SIGNAL FROM A SOURCE ACCESS NODE 110

INSTRUCTIONS TO DETERMINE A DISTANCE MEASUREMENT 112

INSTRUCTIONS TO TRANSFER THE DISTANCE MEASUREMENT TO A TARGET ACCESS NODE OVER AN INTERMEDIATE ANCHOR NODE 114

INSTRUCTIONS TO RECEIVE A LOCATION ERROR FROM THE TARGET ACCESS NODE OVER THE INTERMEDIATE ANCHOR NODE 116

INSTRUCTIONS TO CALIBRATE THE DISTANCE MEASUREMENT BASED ON THE LOCATION ERROR 118

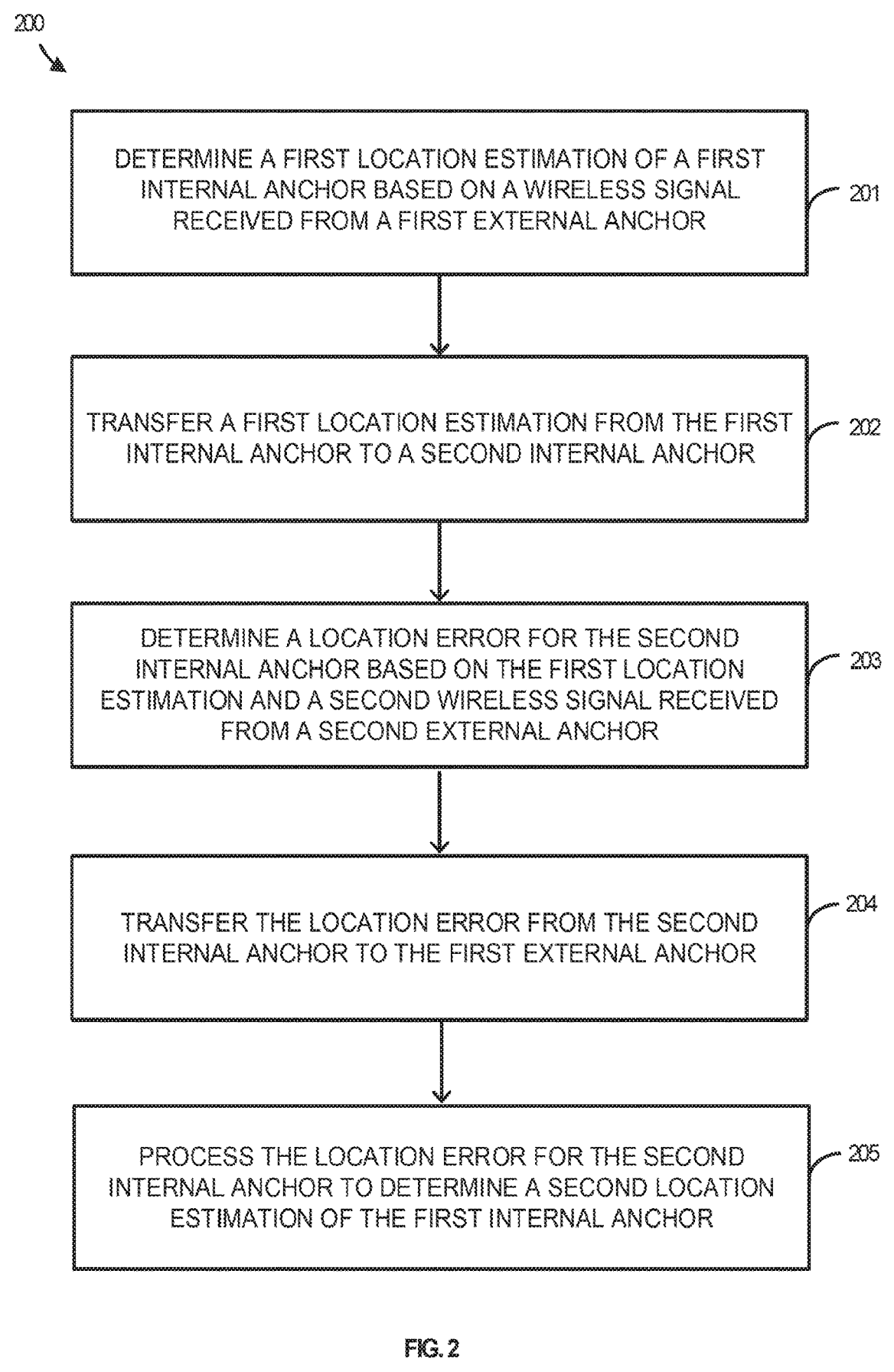

DETERMINE A FIRST LOCATION ESTIMATION OF A FIRST INTERNAL ANCHOR BASED ON A WIRELESS SIGNAL RECEIVED FROM A FIRST EXTERNAL ANCHOR — 201

TRANSFER A FIRST LOCATION ESTIMATION FROM THE FIRST INTERNAL ANCHOR TO A SECOND INTERNAL ANCHOR — 202

DETERMINE A LOCATION ERROR FOR THE SECOND INTERNAL ANCHOR BASED ON THE FIRST LOCATION ESTIMATION AND A SECOND WIRELESS SIGNAL RECEIVED FROM A SECOND EXTERNAL ANCHOR — 203

TRANSFER THE LOCATION ERROR FROM THE SECOND INTERNAL ANCHOR TO THE FIRST EXTERNAL ANCHOR — 204

PROCESS THE LOCATION ERROR FOR THE SECOND INTERNAL ANCHOR TO DETERMINE A SECOND LOCATION ESTIMATION OF THE FIRST INTERNAL ANCHOR — 205

FIG. 2

Figure 3:
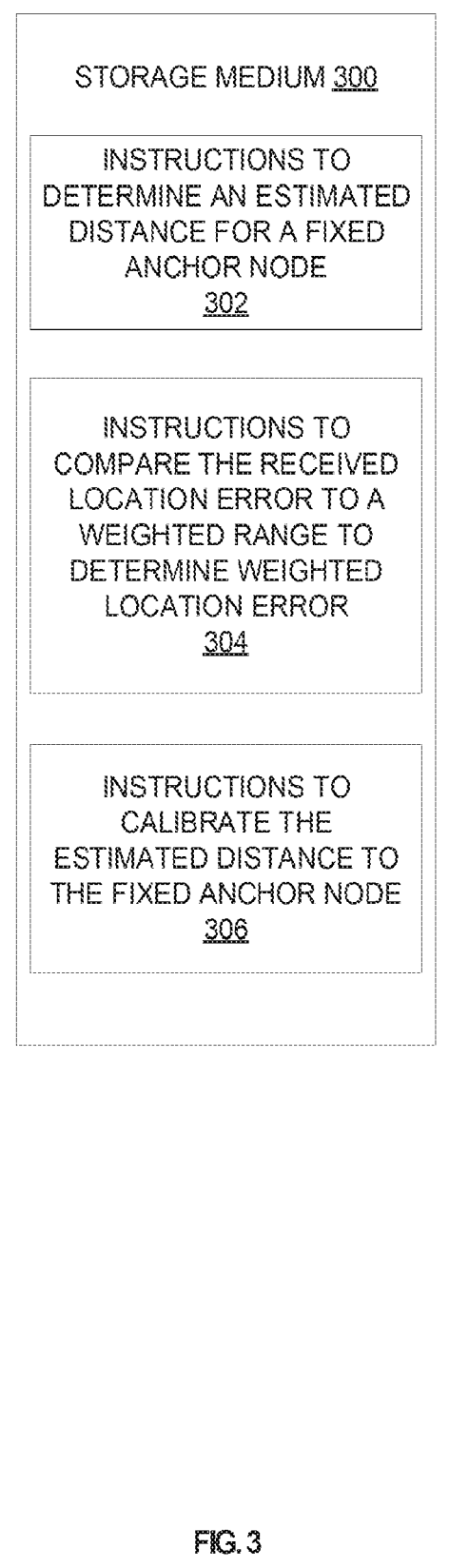

STORAGE MEDIUM 300

INSTRUCTIONS TO DETERMINE AN ESTIMATED DISTANCE FOR A FIXED ANCHOR NODE
302

INSTRUCTIONS TO COMPARE THE RECEIVED LOCATION ERROR TO A WEIGHTED RANGE TO DETERMINE WEIGHTED LOCATION ERROR
304

INSTRUCTIONS TO CALIBRATE THE ESTIMATED DISTANCE TO THE FIXED ANCHOR NODE
306

ANCHOR LOCATION CALIBRATION

BACKGROUND

Wireless systems may be used to determine locations of devices. The wireless systems may include indoor anchors and outdoor datums. The accuracy of the determined locations of devices depends on the accuracy of the determined locations of the indoor anchors.

BRIEF DESCRIPTION OF THE DRAWINGS

Many aspects of the disclosure can be better understood with reference to the following drawings. While several examples are described in connection with these drawings, the disclosure is not limited to the examples disclosed herein.

FIG. 1 illustrates a block diagram of a wireless anchor node having instructions for calibrating a location of the wireless anchor node, according to an example;

FIG. 2 illustrates a flow diagram of a process to calibrate a location of an internal anchor, according to an example;

FIG. 3 illustrates a block diagram of a non-transitory storage medium storing machine-readable instructions to calibrate an estimated distance from an unfixed anchor node to a fixed anchor node, according to an example;

FIG. 6 is a block diagram illustrating a system to calibrate a location of a wireless anchor node, according to another example.

DETAILED DESCRIPTION

Figure 4:
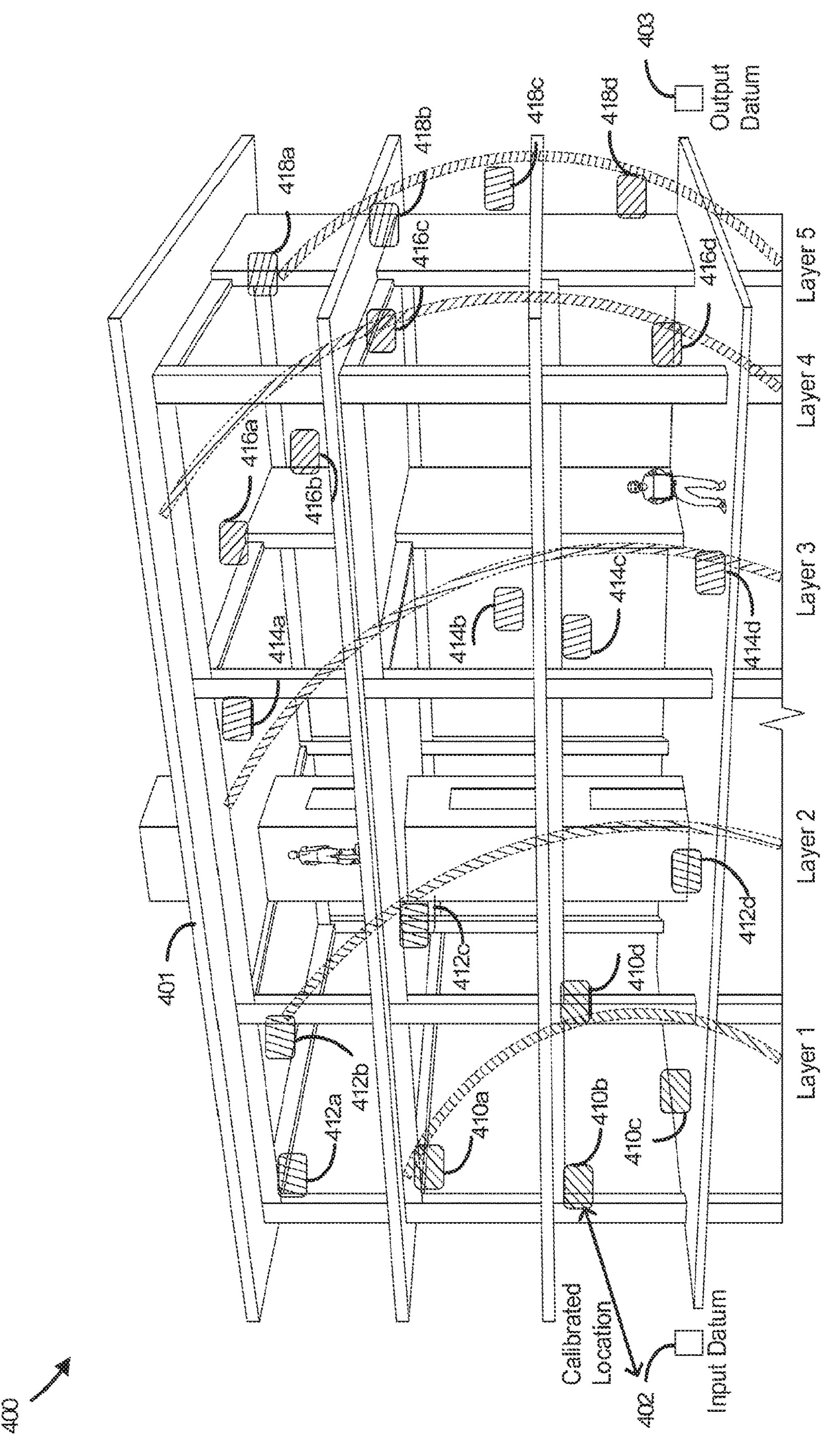
FIG. 4 illustrates an operational architecture of a system for calibrating a location of an indoor anchor, according to another example.

Wireless devices may be located in both indoor and outdoor locations. Determining the location of a device indoors may be difficult since many typical location tracking techniques, such as Global Positioning System (GPS), cannot be used to accurately determine a device's location in an indoor environment. Therefore, determining the location of an indoor device may require additional resources, such as the use of indoor anchors. Indoor anchors may be able to determine their respective location within an indoor facility and provide the wireless device with data to calculate a more accurate location.

While determining the location of a wireless device based on an indoor anchor may be a useful method to get an estimated device location, the location of indoor anchors is often incorrect. Therefore, the estimated device location often has an error related to the location error associated with the indoor anchor. Setting up and calculating an accurate location of an indoor anchor can be timely and costly. Furthermore, each time the indoor anchor is moved, a new location of the indoor anchor would need to be determined. Adaption of the recorded indoor location may be delayed since the cost of setting up the infrastructure may be high. It is also difficult to rely on personnel to install each anchor and then determine their location from an architecture drawing by manually configuring the anchor to record its location. Therefore, it is described, a wireless anchor node, method, and computer readable medium to automatically calibrate a determined location of an indoor anchor.

In an example implementation according to aspects of the present disclosure, a wireless anchor node comprises a wireless communication interface and a processor communicatively coupled to the wireless communication interface. The processor receives, by the wireless communication interface, a wireless signal from a source access node. The location of the source access node is verified. The processor determines a distance measurement between the wireless anchor node and the source access node based on the wireless signal. The processor transfers, by the wireless communication interface, the distance measurement between the wireless anchor node and the source access node to a target access node over an intermediate anchor node. In response, the processor receives, by the wireless communication interface, a location error from the target access node over the intermediate anchor node. The location of the target access node is verified. The processor calibrates the distance measurement between the wireless anchor node and the source access node based on the location error.

In another example, a method comprises determining a first location estimation of a first internal anchor based on a wireless signal received from a first external anchor. The location of the external anchor is verified. The method further comprises transferring a first location estimation from the first internal anchor to a second internal anchor. The method also comprises determining a location error for the second internal anchor based on the first location estimation and a second wireless signal received from a second external anchor. The method comprises transferring the location error from the second internal anchor to the first external anchor and processing the location error for the second internal anchor to determine a second location estimation of the first internal anchor.

In yet another example, a non-transitory computer readable medium comprises instructions executable by a processor to determine, responsive to a round trip time (RTT) of a message wirelessly exchanged with a fixed anchor node, an estimated distance to the fixed anchor node. The instructions compare, responsive to a received location error, the received location error to a weighted range indicator to determine a weighted location error. The instructions calibrate the estimated distance to the fixed anchor node based on the weighted location error.

FIG. 1 illustrates a block diagram of wireless anchor node 100 having instructions for calibrating a location of a wireless anchor node, according to an example. Wireless anchor node 100 depicts communication interface 102, processor 104, and memory 106. As an example of wireless anchor node 100 performing its operations, memory 106 may include instructions 110-118 that are executable by processor 104. Thus, memory 106 can be said to store program instructions that, when executed by processor 104, implement the components of wireless anchor node 100.

In particular, the executable instructions stored in memory 106 include, as an example, instructions 110 to receive a wireless signal from a source access node and instructions 112 to determine a distance measurement. The executable instructions stored in memory 106 also include, as an example, instructions 114 to transfer the distance measurement to a target access node over an intermediate anchor node, instructions 116 to receive a location error from the target access node over the intermediate anchor node, and instructions 118 to calibrate the distance measurement based on the location error.

Instructions 110 to receive a wireless signal from a source access node represent program instructions that when executed by processor 104 cause wireless anchor node 100 to receive, by wireless communication interface 102, a wireless signal from a source access node, wherein the location of the source access node is verified. Wireless anchor node 100 may represent an indoor anchor node. An indoor anchor node may be used to determine device locations while located within a cover structure. For example, wireless anchor node 100 may include a printer, desktop computer, tablet, etc. In some examples, wireless anchor node 100 may be one anchor node in an array of wireless anchor nodes. In other examples, wireless anchor node 100 may be paired with another wireless anchor node that is located at a different distance from external nodes. The wireless signal may include a control signal, a data signal, etc. The wireless signal may include a message that is exchanged between wireless anchor node 100 and the source access node.

In some examples, the source access node may be located external to a covered structure in which wireless anchor node 100 is located. However, in other example, source access node may be located in a location within the covered structure but beyond a threshold distance and/or signal strength from a device that is using wireless access node 100 to determine its location. The source access node may include a verified or fixed datum. For example, wireless access anchor node 100 may represent an indoor anchor and the source access node may represent an external datum. The location of the source access node may be verified using surveying equipment, GPS, etc. For purposes of this example, it may be determined that the location of the source access node is fixed and accurate to a threshold level. In some examples, the wireless signal is received from the source access node over a first set of wireless nodes of the plurality of wireless anchor nodes in the array of wireless anchor nodes.

Instructions 112 to determine a distance measurement represent program instructions that when executed by processor 104 cause wireless anchor node 100 to determine a distance measurement between wireless anchor node 100 and the source access node based on the wireless signal. The distance measurement may include a latitude coordinate (X) and a longitude coordinate (Y). The distance measurement may further, or alternatively include a height (Z) of wireless anchor node 100 from ground level or from the source access node. In some examples, the distance measurement between wireless anchor node 100 and the source access node is determined based on an RTT of a message wirelessly exchanged between wireless anchor node 100 and the source access node. In yet another example, the distance measurement between wireless anchor node 100 and the source access node is determined in response to a received signal strength indicator (RSSI) of the wireless signal being above an RSSI threshold.

Instructions 114 to transfer the distance measurement to a target access node over an intermediate anchor node represent program instructions that when executed by processor 104 cause wireless anchor node 100 to transfer, by wireless communication interface 102, the distance measurement between wireless anchor node 100 and the source access node to a target access node over an intermediate anchor node. The location of the target access node may be located in an external and/or fixed location. The location of target access node may be verified using surveying equipment, GPS, etc. For purposes of this example, it may be determined that the location of the target access node is fixed and accurate to a threshold level. The intermediate anchor node may include a printer, desktop computer, scanner/fax machine, tablet, etc. The intermediate anchor node may be an anchor node in an array of anchor nodes. In some examples, intermediate anchor node and wireless anchor node 100 may include a set of anchor nodes which transfer location error data between the source access node and the target access node.

Instructions 116 to receive a location error from the target access node over the intermediate anchor node represent program instructions that when executed by processor 104 cause wireless anchor node 100 to receive, by wireless communication interface 102, a location error from the target access node over the intermediate anchor node, wherein the location of the target access node is verified. In some examples, the location error is received from the target access node over a second set of wireless nodes of the plurality of wireless nodes in the array of wireless nodes. In other examples, the distance measurement between wireless anchor node 100 and the source access node is determined by weighing the location error based on a ranging distance between wireless anchor node 100 and the intermediate anchor node.

Instructions 118 to calibrate the distance measurement based on the location error represent program instructions that when executed by processor 104 cause wireless anchor node 100 to calibrate the distance measurement between wireless anchor node 100 and the source access node based on the location error. In some examples, the distance measurement is used to determine a location of another device, such as a user device.

In some examples, the source access node and the target access node each include an external datum that may be used to determine additional locations using radio signaling. For example, source access node may be located on one side of a building and target access node may be located on another side of a building. In this example, wireless anchor node 100 and the intermediate anchor nodes may represent indoor anchors which may be used to determine locations of devices within a building.

In some examples, in response to the calibration of the distance measurement, instructions 118 further direct processor 104 to determine that the location error exceeds a threshold location error. In response, instructions 118 directs processor 104 to transfer, by wireless communication interface 102, the distance measurement between wireless anchor node 100 and the source access node to the target access node over the intermediate anchor node. In response, wireless anchor node 100 receives, by wireless communication interface 102, a modified location error from the target access node over the intermediate anchor node.

Memory 106 represents any number of memory components capable of storing instructions that can be executed by processor 104. As a result, memory 106 may be implemented in a single device or distributed across devices. Likewise, processor 104 represents any number of processors capable of executing instructions stored by memory 106.

FIG. 2 illustrates a flow diagram of method 200 to calibrate a location of an internal anchor, according to an example. Some or all of the steps of method 200 may be implemented in program instructions in the context of a component or components of an application used to carry out the anchor calibration feature. Although the flow diagram of FIG. 2 shows a specific order of execution, the order of execution may differ from that which is depicted. For example, the order of execution of two of more blocks shown in succession by be executed concurrently or with partial concurrence. All such variations are within the scope of the present disclosure.

Referring to the steps in FIG. 2, method 200 determines a first location estimation of a first internal anchor based on a wireless signal received from a first external anchor, wherein the external anchor has a verified location, at 201. The first location estimation of the first internal anchor may be determined based on an RTT of a message exchanged between the first external anchor and the first internal anchor. The internal anchors may include printers, docks, displays, workstations, desktops, or any other wireless device.

Method 200 transfers a first location estimation from the first internal anchor to a second internal anchor, at 202. In some examples, the first location estimation comprises a latitude coordinate (X coordinate), a longitude coordinate (Y coordinate), and a height coordinate (Z coordinate). For example, the first location estimation may include a location of (X1, Y1, and Z1). The first location estimation may be determined in reference to the first external anchor. The anchors organize themselves in layers based on strength of the wireless signals or some such distance metric In some examples, the internal anchors are organized into layers based on the signal strength from the external anchors. For example, a first layer of internal anchors may be organized with respect to an external anchor whose location is more precisely known. Each subsequent layer of internal anchors may further determine their location from the previous layer until the second external anchor is reached. Therefore, each internal anchor in the subsequent layers may try to independently determine their location relative to all the anchors in the previous layer. It should be noted that in some examples, the external anchors may be referred to as datums. For the first layer there is only one anchor which is the datum.

Method 200 determines a location error for the second internal anchor based on the first location estimation and a second wireless signal received from a second external anchor, at 203. For example, the second internal anchor may determine a predicted location of itself based on the first estimated location received from the first internal anchor. The second internal anchor may also wirelessly exchange signaling with the second external anchor to determine a second predicted location of itself. Since the second external anchor is fixed, the distance of the second internal anchor to the second external anchor may result in a more accurate location. Therefore, the location error of the second internal anchor may be determined by comparing the predicted location from the first internal anchor and the more accurate location determined by wireless signaling with the second external anchor.

In this example, the location error may be determined by comparing a first set of coordinates for the second location estimation, such as (X2, Y2, Z2), with a second set of coordinates for the second location estimation, such as (X3, Y3, Z3). In some examples, the second external anchor knows its location precisely since it is the second datum. Therefore, the error between the second internal anchor (which it determined from the last layer of anchors) and the second external anchor can be determined. It should be noted that the more accurate location of the second external anchor may be determined independently from the process described in method 200.

Method 200 transfers the location error from the second internal anchor to the first external anchor, at 204. In some examples, the location error is propagated back through the previous layers of internal anchors and continues until the first external anchor is reached. Method 200 processes the location error for the second internal anchor to determine a second location estimation of the first internal anchor, at 205. In some examples, the second location estimation of the first internal anchor is determined by weighing the location error based on a ranging distance between the first internal anchor and the second internal anchor. In some examples, the degree of error for each internal anchor is determined by how many layers of internal anchors have participated in propagating the location from the first external anchor to the second internal anchor. Therefore, the error for each internal anchor may vary. Furthermore, once each internal anchor determines their respective location error based on the location error received from the previous internal anchor and the weighted range for the internal anchor, each internal anchor may adjust their perceived location and used the adjusted location estimate to determine the location of other user devices.

In some examples, the second location estimation comprises a latitude coordinate (X coordinate), a longitude coordinate (Y coordinate), and a height coordinate (z coordinate). For example, the second location estimation may include a location of (X2, Y2, and Z2). The second location estimation may be determined by adjusting the first set of coordinates (X1, Y1, Z1) using a weighted range of the location error as determined by the second internal anchor.

By allowing internal anchors to be automatically calibrated, the configured locations of the internal anchors are more accurate, especially when the anchor moves. Furthermore, the process described in method 200 would allow the cost of configuring internal anchors to be reduced and allow an adoption of indoor location technologies that require infrastructure support, such as Wireless Fidelity (WiFi) and Bluetooth.

FIG. 3 illustrates a block diagram of non-transitory storage medium 300 storing machine-readable instructions that upon execution cause a system to calibrate an estimated distance to a fixed anchor node, according to an example. Storage medium is non-transitory in the sense that is does not encompass a transitory signal but instead is made up of a memory component configured to store the relevant instructions.

The machine-readable instructions include instructions 302 to determine, responsive to an RTT of a message exchanged with a fixed anchor node, an estimated distance to the fixed anchor node. The machine-readable instructions also include instructions 304 to compare, responsive to a received location error, the received location error to a weighted range indicator to determine a weighted location error. The machine-readable instructions also include instructions 306 to calibrate the estimated distance to the fixed anchor node based on the weighted location error.

In one example, program instructions 302-306 can be part of an installation package that when installed can be executed by a processor to implement the components of a computing device. In this case, non-transitory storage medium 300 may be a portable medium such as a CD, DVD, or a flash drive. Non-transitory storage medium 300 may also be maintained by a server from which the installation package can be downloaded and installed. In another example, the program instructions may be part of an application or applications already installed. Here, non-transitory storage medium 300 can include integrated memory, such as a hard drive, solid state drive, and the like.

FIG. 4 illustrates an operational architecture of a system for calibrating a location of an indoor anchor, according to another example. FIG. 4 illustrates operational scenario 400 that relates to what occurs when the estimated location of an indoor anchor is calibrated using an input and output datum.

Operational scenario 400 includes indoor structure 401, input datum 402, output datum 403, and location anchors 410*a-d*, 412*a-d*, 414*a-d*, 416*a-d*, and 418*a-d*. As illustrated in FIG. 4, input datum 402 and output datum 403 are located external to indoor structure 401. Furthermore, each of the indoor anchors is associated with a different layer. For example, location anchors 410*a-d* are associated with layer 1, location anchors 412*a-d* are associated with layer 2, location anchors 414*a-d* are associated with layer 3, location anchors 416*a-d* are associated with layer 4, location anchors 418*a-d* are associated with layer 5. Layers 1-5 indicate a RSSI range from input datum 402.

Each of location anchors 410*a-d*, 412*a-d*, 414*a-d*, 416*a-d*, and 418*a-d* is equipped with a radio frequency (RF) technology like Ultra-Wide Band (UWB), which allows reasonably precise ranging. The ranging can be made more precise with round trip measurements. Furthermore, bi-directional (each anchor pair getting each other's range) ranging can be used to create additional data points. It should also be noted that location anchors 410*a-d*, 412*a-d*, 414*a-d*, 416*a-d*, and 418*a-d* are an access point which may use a WiFi or Bluetooth access point. Therefore, the RF used to auto-calibrate may use WiFi, Bluetooth, or some other wireless signaling.

Input datum 402 and output datum 403 may each be placed in a fixed location which is external to indoor structure 401 or internal to indoor structure 401. For example, input datum 402 and output datum 403 may use any external technology or tool which may allow datums 402 and 403 to be placed in a fixed location (e.g., by using a precise geographic survey). It should also be noted that the higher the precision of the location of datums 402 and 403, the higher the precision of the overall system location accuracy since location anchors 410*a-d*, 412*a-d*, 414*a-d*, 416*a-d*, and 418*a-d* will be set based on the locations of input datum 402 and output datum 403.

In this example scenario, it may be preferred that input datum 402 and output datum 403 are not within radio distance of each other. Furthermore, adding additional datums could increase the precision. For initial placement or installation, location anchors 410*a-d*, 412*a-d*, 414*a-d*, 416*a-d*, and 418*a-d* can be placed in desired spots within indoor structure 401 to ensure that there is reasonable density and that location anchors 410*a-d*, 412*a-d*, 414*a-d*, 416*a-d*, and 418*a-d* are within radio distance of each other. The locations of location anchors 410*a-d*, 412*a-d*, 414*a-d*, 416*a-d*, and 418*a-d* are not initially known. It should also be noted that each time one of location anchors 410*a-d*, 412*a-d*, 414*a-d*, 416*a-d*, and 418*a-d* is moved, the auto-calibration process may be performed. A recalibration of the locations may be trigged manually or automatically.

Figure 5:
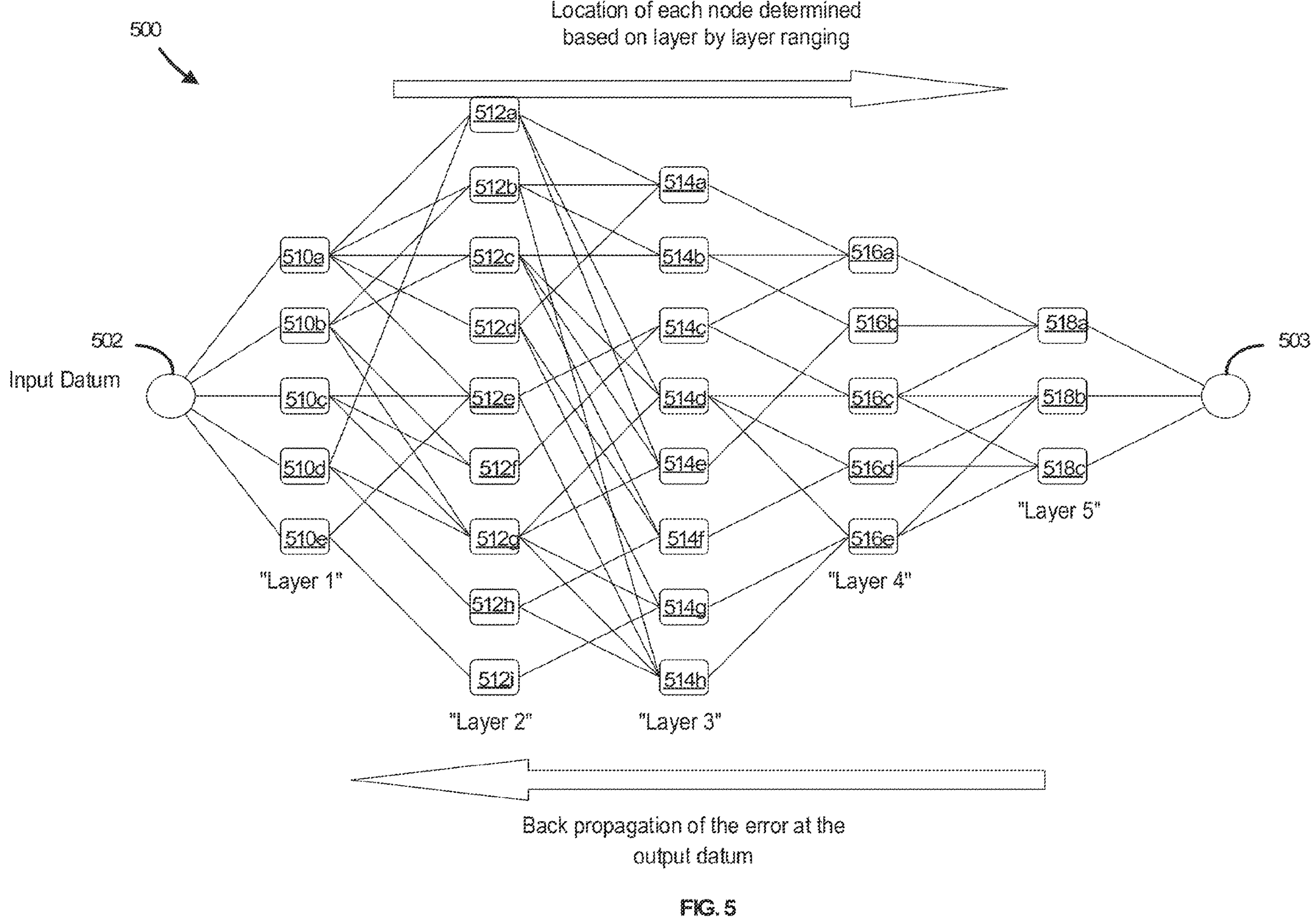
FIG. 5 illustrates an operational diagram to calibrate a location of an indoor anchor, according to another example.

FIG. 5 illustrates an operational diagram of a system for calibrating a location of an indoor anchor, according to another example. FIG. 5 illustrates operational diagram 500 that relates to what occurs when the estimated location of an indoor anchor is calibrated using an input datum and an output datum. Operational scenario 500 includes input datum 502, output datum 503, and location anchors 510*a*-8, 512*a-i*, 514*a-h*, 516*a-e*, and 518*a-c*. As illustrated in FIG. 5, input datum 502 and output datum 503 are located external to the network to location anchors. Furthermore, each of the indoor anchors is associated with a different layer. For examples, location anchors 510*a-e* are associated with layer 1, location anchors 512*a-h* are associated with layer 2, location anchors 514*a-h* are associated with layer 3, location anchors 516*a-e* are associated with layer 4, location anchors 518*a-c* are associated with layer 5. Layers 1-5 indicate a RSSI range from input datum 402.

Referring still to FIG. 5, the anchors form a graph starting from the first datum 502 to the second datum 503. The process for building the graph is by using RSSI thresholds to determine which location anchors to include in each layer. Input datum 502 is the "input layer." Input datum 502 also encodes its layer (i.e. layer 0) in its ranging. Anchors that are within a specific RSSI threshold of the datum become layer 1. Anchors in layer 1 may encode their layer in the output. Other anchors that can see layer 1 anchors (except anchors in layers that have equal or lesser layer values) will encode as layer 2. This process continues until the output datum 503 is reached. Anchors in a particular layer get their location bearings from the previous layer and provide location bearing to the next layer.

Each connection between the location anchors is the "ranging" distance that has been determined based on appropriate techniques for the radio protocol. For UWB, this may include "Time of Arrival" and "Angle of Arrival" (for height determination). Alternatively, if the all the devices are connected, then some form of centralized processing can be used and "Time Difference of Arrival" may be used.

The location of a first location anchor, such as anchor 510*a*, is determined using the range distances to the nodes in the previous layer, such as 512*a-e*. The ranges may be combined using trilateration for latitude coordinates and longitude coordinates, and triangulation for height coordinates. This process is determined until output datum 503 is reached. At this time, the output datum 503 may measure its location using the ranging from the previous layer. The error has contribution from all the errors in the previous layers based on the ranging (i.e. weights) at those layers.

Next, by using a gradient descent to backpropagate the error into the previous nodes, new weights may be determined. Furthermore, more than one iteration may be done once the error has been propagated to input datum 502. The process may be repeated over many cycles until the locations errors are below a threshold or rate of error.

At this time each of the nodes have their location determined in both the horizontal and vertical direction. In some examples, the vertical location may be converted into floor number information using the height of each floor and the height of the building. These nodes then become anchors (i.e. points whose locations are known to high accuracy). The location anchors may further allow other devices to determine their location within the environment.

Figure 6:
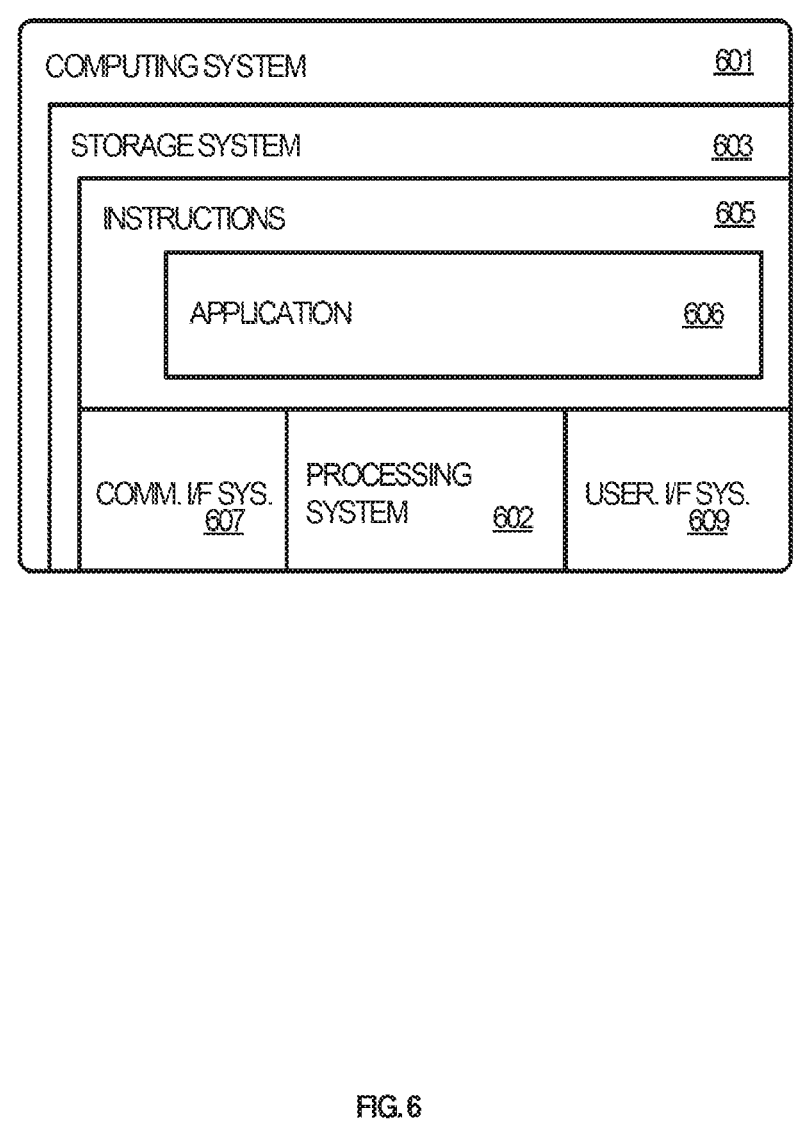

FIG. 6 illustrates computing system 601, which is representative of any system or visual representation of systems in which the various applications, services, scenarios, and processes disclosed herein may be implemented. Examples of computing system 601 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 601 may be implemented as a single apparatus, system, or device or may be implemented in a distributed manner as multiple apparatuses, systems, or devices. Computing system 601 includes, but is not limited to, processing system 602, storage system 603, instructions 605, communication interface system 607, and user interface system 609. Processing system 602 is operatively coupled with storage system 603, communication interface system 607, and user interface system 609.

Processing system 602 loads and executes instructions 605 from storage system 603. Instructions 605 includes application 606, which is representative of the processes discussed with respect to the preceding FIGS. 1-5, including method 200. When executed by processing system 602 to enhance an application, instructions 605 directs processing system 602 to operate as described herein for at least the various processes, operational scenarios, and sequences discussed in the foregoing examples. Computing system 601 may optionally include additional devices, features, or functionality not discussed for purposes of brevity.

Referring still to FIG. 6, processing system 602 may comprise a micro-processor and other circuitry that retrieves and executes instructions 605 from storage system 603. Processing system 602 may be implemented within a single processing device but may also be distributed across multiple processing devices or sub-systems that cooperate in executing program instructions. Examples of processing system 602 include general purpose central processing units, graphical processing unites, application specific processors, and logic devices, as well as any other type of processing device, combination, or variation.

Storage system 603 may comprise any computer readable storage media readable by processing system 602 and capable of storing instructions 605. Storage system 603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. Storage system 603 may be implemented as a single storage device but may also be implemented across multiple storage devices or sub-systems co-located or distributed relative to each other. Storage system 603 may comprise additional elements, such as a controller, capable of communicating with processing system 602 or possibly other systems.

Instructions 605 may be implemented in program instructions and among other functions may, when executed by processing system 602, direct processing system 602 to operate as described with respect to the various operational scenarios, sequences, and processes illustrated herein. Instructions 605 may include program instructions for implementing method 200.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Instructions 605 may include additional processes, programs, or components, such as operating system software, virtual machine software, or other application software, in addition to or that include process 606. Instructions 605 may also comprise firmware or some other form of machine-readable processing instructions executable by processing system 602.

In general, instructions 605 may, when loaded into processing system 602 and executed, transform a suitable apparatus, system, or device (of which computing system 601 is representative) overall from a general-purpose computing system into a special-purpose computing system. Indeed, encoding instructions 605 on storage system 603 may transform the physical structure of storage system 603. The specific transformation of the physical structure may depend on various factors in different examples of this description. Such factors may include, but are not limited to, the technology used to implement the storage media of storage system 603 and whether the computer-storage media are characterized as primary or secondary storage, as well as other factors.

If the computer readable storage media are implemented as semiconductor-based memory, instructions 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 607 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 609 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 609. In some cases, the input and output devices may be combined in a single device, such as a display capable of displaying images and receiving touch gestures. The aforementioned user input and output devices are well known in the art and need not be discussed at length here. User interface system 609 may also include associated user interface software executable by processing system 602 in support of the various user input and output devices discussed above.

Communication between computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here.

Certain inventive aspects may be appreciated from the foregoing disclosure, of which the following are various examples.

The functional block diagrams, operational scenarios and sequences, and flow diagrams provided in the FIG.s are representative of example systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. It should be noted that a method could alternatively be represented as a series of interrelated states or events, such as in a state diagram. Moreover, not all acts illustrated in a methodology may be required for a novel example.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

The invention claimed is:

1. A wireless anchor node comprising:
- a wireless communication interface; and
- a processor communicatively coupled to the wireless communication interface, the processor to:
- receive, by the wireless communication interface, a wireless signal from a source access node, wherein a location of the source access node is verified;
- determine a distance measurement between the wireless anchor node and the source access node based on the wireless signal;
- transfer, by the wireless communication interface, the distance measurement between the wireless anchor node and the source access node to a target access node over an intermediate anchor node;
- in response, receive, by the wireless communication interface, a location error from the target access node over the intermediate anchor node, wherein a location of the target access node is verified; and
- calibrate the distance measurement between the wireless anchor node and the source access node based on the location error.

2. The wireless anchor node of claim 1 wherein, the wireless anchor node is one of a plurality of wireless anchor nodes in an array of wireless anchor nodes.

3. The wireless anchor node of claim 2 wherein, the wireless signal is received from the source access node over a first set of wireless anchor nodes of the plurality of wireless anchor nodes in the array of wireless anchor nodes.

4. The wireless anchor node of claim 3 wherein, the location error is received from the target access node over a second set of wireless anchor nodes of the plurality of wireless anchor nodes in the array of wireless anchor nodes.

5. The wireless anchor node of claim 1 wherein, the processor further:
- determines that the location error exceeds a threshold location error;
- transfers, by the wireless communication interface, the distance measurement between the wireless anchor node and the source access node to the target access node over the intermediate anchor node; and
- in response, receives, by the wireless communication interface, a modified location error from the target access node over the intermediate anchor node.

6. The wireless anchor node of claim 1 wherein, the distance measurement between the wireless anchor node and the source access node is determined by weighing the location error based on a ranging distance between the wireless anchor node and the intermediate anchor node.

7. The wireless anchor node of claim 1 wherein, the distance measurement between the wireless anchor node and the source access node is determined in response to a received signal strength indicator (RSSI) of the wireless signal being above an RSSI threshold.

8. The wireless anchor node of claim 1 wherein, the distance measurement between the wireless anchor node and the source access node is determined based on a round trip time (RTT) of a message exchanged between the wireless anchor node and the source access node.

9. The wireless anchor node of claim 1 wherein, the distance measurement is used to determine a location of a user device.

10. A method comprising, at a wireless anchor node:
- receiving, by a wireless communication interface, a wireless signal from a source access node, wherein a location of the source access node is verified;
- determining a distance measurement between the wireless anchor node and the source access node based on the wireless signal;
- transferring, by the wireless communication interface, the distance measurement between the wireless anchor node and the source access node to a target access node over an intermediate anchor node;
- in response, receiving, by the wireless communication interface, a location error from the target access node over the intermediate anchor node, wherein a location of the target access node is verified; and
- calibrating the distance measurement between the wireless anchor node and the source access node based on the location error.

11. The method of claim 10, further comprising:
- determining that the location error exceeds a threshold location error;
- transferring, by the wireless communication interface, the distance measurement between the wireless anchor node and the source access node to the target access node over the intermediate anchor node; and
- in response, receiving, by the wireless communication interface, a modified location error from the target access node over the intermediate anchor node.

12. The method of claim 10, further comprising determining the distance measurement between the wireless anchor node and the source access node by weighing the location error based on a ranging distance between the wireless anchor node and the intermediate anchor node.

13. The method of claim 10, further comprising determining the distance measurement between the wireless anchor node and the source access node in response to a received signal strength indicator (RSSI) of the wireless signal being above an RSSI threshold.

14. The method of claim 10, further comprising determining the distance measurement between the wireless anchor node and the source access node based on a round trip time (RTT) of a message exchanged between the wireless anchor node and the source access node.

15. The method of claim 10, further comprising using the distance measurement to determine a location of a user device.

16. A non-transitory computer readable medium comprising instructions executable by a processor of a wireless anchor node to:

receive, by a wireless communication interface of the wireless anchor node, a wireless signal from a source access node, wherein a location of the source access node is verified;

determine a distance measurement between the wireless anchor node and the source access node based on the wireless signal;

transfer, by the wireless communication interface, the distance measurement between the wireless anchor node and the source access node to a target access node over an intermediate anchor node;

in response, receive, by the wireless communication interface, a location error from the target access node over the intermediate anchor node, wherein a location of the target access node is verified; and calibrate the distance measurement between the wireless anchor node and the source access node based on the location error.

17. The non-transitory computer readable medium of claim 16, wherein the instructions are further executable by the processor to:

determine that the location error exceeds a threshold location error;

transfer, by the wireless communication interface, the distance measurement between the wireless anchor node and the source access node to the target access node over the intermediate anchor node; and in response, receive, by the wireless communication interface, a modified location error from the target access node over the intermediate anchor node.

18. The non-transitory computer readable medium of claim 16, wherein the instructions are further executable by the processor to determine the distance measurement between the wireless anchor node and the source access node by weighing the location error based on a ranging distance between the wireless anchor node and the intermediate anchor node.

19. The non-transitory computer readable medium of claim 16, wherein the instructions are further executable by the processor to determine the distance measurement between the wireless anchor node and the source access node in response to a received signal strength indicator (RSSI) of the wireless signal being above an RSSI threshold.

20. The non-transitory computer readable medium of claim 16, wherein the instructions are further executable by the processor to determine the distance measurement between the wireless anchor node and the source access node based on a round trip time (RTT) of a message exchanged between the wireless anchor node and the source access node.

* * * * *